(12) United States Patent
Bollinger et al.

(10) Patent No.: US 9,945,339 B2
(45) Date of Patent: Apr. 17, 2018

(54) METHOD FOR DETERMINING QUANTITIES OF FUEL DURING A DIRECT INJECTION OF A MOTOR VEHICLE

(71) Applicant: Robert Bosch GmbH, Stuttgart (DE)

(72) Inventors: Stefan Bollinger, Marback am Neckar (DE); Joachim Palmer, Korntal-Muenchingen (DE); Andreas Gessler, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 553 days.

(21) Appl. No.: 14/615,183

(22) Filed: Feb. 5, 2015

(65) Prior Publication Data
US 2015/0219053 A1    Aug. 6, 2015

(30) Foreign Application Priority Data

Feb. 6, 2014    (DE) .................. 10 2014 202 121

(51) Int. Cl.
| | |
|---|---|
| *F02M 65/00* | (2006.01) |
| *F02D 41/22* | (2006.01) |
| *F02D 41/14* | (2006.01) |
| *F02D 41/12* | (2006.01) |
| *G01F 9/02* | (2006.01) |
| *G01F 9/00* | (2006.01) |
| *F02D 41/28* | (2006.01) |
| *F02D 41/24* | (2006.01) |

(52) U.S. Cl.
CPC ......... *F02M 65/001* (2013.01); *F02D 41/123* (2013.01); *F02D 41/1497* (2013.01); *F02D 41/221* (2013.01); *G01F 9/006* (2013.01); *G01F 9/023* (2013.01); *F02D 41/247* (2013.01); *F02D 2041/224* (2013.01); *F02D 2041/286* (2013.01); *F02D 2200/101* (2013.01)

(58) Field of Classification Search
CPC . F02M 65/001; F02D 41/1497; F02D 41/221; F02D 41/123; F02D 2041/224; F02D 2041/286; F02D 41/247; F02D 2200/101; G01F 9/023; G01F 9/006
USPC ........................................ 73/114.45–114.53
See application file for complete search history.

(56) References Cited

U.S. PATENT DOCUMENTS

2011/0040474 A1* 2/2011 Hiratani .............. F02D 41/0085
                                                                   701/104

FOREIGN PATENT DOCUMENTS

DE    10 2011 007 563    10/2012

* cited by examiner

*Primary Examiner* — Peter Macchiarolo
*Assistant Examiner* — Anthony W Megna Fuentes
(74) *Attorney, Agent, or Firm* — Norton Rose Fulbright US LLP; Gerard Messina

(57) ABSTRACT

In the method provided herein, quantities of fuel are determined during a direct injection of a motor vehicle. In this connection, within one work cycle, test injections are carried out in two cylinders of an internal combustion engine of the motor vehicle during overrun phases, speed oscillations of moved masses of the cylinders are measured and a relative difference in quantity of the fuel quantity of the test injections within one work cycle is determined from the speed oscillations. By evaluating a relative signal between the test injections within one work cycle in the two cylinders, an intrinsic dependence of the drive train of the quantity of fuel signal is compensated.

18 Claims, 4 Drawing Sheets

METHOD FOR DETERMINING QUANTITIES OF FUEL DURING A DIRECT INJECTION OF A MOTOR VEHICLE

FIELD OF THE INVENTION

The present invention relates to a method for determining quantities of fuel during a direct injection of a motor vehicle. Furthermore, the present invention relates to a computer program which carries out each step of the method according to the present invention when it is run on a computing device, as well as an electronic storage medium which stores this computer program. Finally, the present invention relates to an electronic control unit which includes the electronic storage medium.

BACKGROUND INFORMATION

Conventional motor vehicles using diesel as fuel are generally equipped with an electronically regulated common rail injection system. These motor vehicles are subject to legislation for exhaust gases which, especially in large areas of the USA and other countries having comparable CARB (California Air Resources Board) legislation, require system-immanent monitoring of emissions of the motor vehicle. Violations of emissions limits by, for example, incorrect quantities in the fuel injection system must be diagnosed in the shortest possible periods of time and be displayed by activating an indicator lamp.

This requirement is fulfilled by monitoring an adaptation value of a speed-based zero quantity calibration, whose actual purpose is the adaptation and compensation of fuel-quantity drift of an injector over its lifetime. In a zero quantity calibration, the quantity of the fuel to be injected is increased in small steps until a noticeable change in speed of the motor vehicle's internal combustion engine is present. If the adaptation value is outside of a required interval, the injector is diagnosed as defective. A disadvantage of this method, primarily from the point of view of a customer, is a logistically complex and time-consuming application of the underlying zero quantity calibration, which is specific with regard to the drive train and vehicle.

From a technical perspective, a comparable method for monitoring the adaptation value of a drive train-independent zero quantity calibration is likewise implementable in order to identify a defective injector, making it possible to eliminate the above-named disadvantages of an application specific to a drive train. In a drive train-independent zero quantity calibration, a drive train of the motor vehicle is simulated by a model. However, such a method will not be able to satisfy the stringent requirements of the CARB legislation with respect to speed of diagnosis, since the drive train-independent zero quantity calibration has a significantly lower adaptation speed than the drive train-dependent zero quantity calibration due to its functional principle.

SUMMARY

In the method according to the present invention, quantities of fuel are determined during a direct injection of a motor vehicle. In this connection, within one work cycle, test injections are carried out into two cylinders of an internal combustion engine of the motor vehicle during overrun phases, speed oscillations of moved masses of the cylinders are measured and a relative difference in quantity of the fuel quantity of the test injections within one work cycle is determined from the speed oscillations. By evaluating a relative signal between the test injections within one work cycle in the two cylinders, an intrinsic drive train dependence of the signal of the quantity of fuel is compensated. This is accompanied by significantly reduced application complexity and a possibility of using this method together with a drive train-independent zero quantity calibration in the same vehicle. The method according to the present invention is sufficiently fast to satisfy the requirements of CARB legislation with regard to speed of diagnosis. In contrast to this, a method based on the drive train-independent zero quantity calibration according to the related art will not satisfy these requirements. The test injections within one work cycle make it possible in principle to monitor double the number of injectors within the same period of time. The associated increase in the speed of the diagnosis is advantageous with respect to the narrow boundaries of the legislation in this regard and possible future changes in law. The free-floating structure of a functional algorithm allows a systematic separation of a diagnostic and adaptation function and consequently supports modularization of a control unit function.

Preferably, the test injections into the two cylinders are carried out using activation periods for which the same injection quantities are expected. This makes it possible to easily determine the relative difference in quantity later.

It is particularly preferred to calculate the two complex oscillation amplitudes from a total amplitude of the speed oscillations having two complex oscillation amplitudes, an absolute phase of the first complex oscillation amplitude and a relative phase of the two complex oscillation amplitudes, a ratio of the two complex oscillation amplitudes corresponding to a ratio of the injected quantities of fuel. This makes it possible to model the quantities of fuel very well and the method according to the present invention may be carried out for determining the relative difference in quantity of fuel.

It is very particularly preferred that the absolute phase is measured by test injections on exclusively one of the two cylinders. This has the advantage that only one absolute phase must be measured. The other is determined by the relative phase established by a design of the engine.

It is very particularly preferred that multiple test injections are carried out within the work cycle for multiple cylinder permutations of cylinder pairs. This makes it possible to investigate all cylinders in sequence for errors in the fuel injection quantity.

In particular, the cylinder permutations in the multiple test injections within one work cycle are consistently selected in such a way that a phase difference of the complex oscillation amplitudes of the cylinders does not lie in the range from 170° to 190°; preferably it lies in the range from 80° to 100°.

In particular, a parameter is determined from a ratio of the complex oscillation amplitudes of multiple cylinder permutations, and it is ascertained from the parameter whether the relative quantity difference occurs. Using this method, the relative quantity difference may be determined very well. In this way, the relative quantity difference of exactly two cylinders is always observed.

Preferably, the two complex oscillation amplitudes for the test injections into two cylinders are selected in such a way that their phase difference lies in the range from 170° to 190°, the two test injections into the cylinders being carried out using two different activation periods. With the aid of this method, the relative quantity difference may be determined in a particularly simple manner.

It is particularly preferred that the two test injections are repeated and the activation period, which was shorter in the first method run, is increased by double the amount of the difference between the two activation periods. This makes it necessary for the sign of the phase of the total amplitude to change without a relative difference in quantity. With the aid of this method, it is thus possible to determine a relative quantity difference in a simple manner.

It is very particularly preferred that the total amplitude of the complex oscillation amplitudes is measured in each of the two method runs, the two total amplitudes are compared with one another and the difference in quantity is inferred from the result. In particular, the phase difference of the two total amplitudes is compared in the comparison. The comparison of the phase difference of the two total amplitudes makes it possible to unambiguously establish whether a relative difference in quantity is present or not.

In determining the quantities of fuel, a tentative diagnosis is preferably provided within a predefined time span according to the present invention, which is checked for plausibility and quantified in another method run according the method of the present invention. This has the advantage that the two alternative possibilities for determining the quantity of fuel according to the present invention optimally complement one another.

In particular, the amounts of the total amplitudes are compared with a signal noise. Consequently, only signals that also have experimental relevance are evaluated.

Preferably, the phase difference between the two total amplitudes lies in angular ranges of −10° to 10° or 170° to 190°. This ensures that a result of the test injections within one work cycle is also plausible.

The computer program according to the present invention makes it possible to implement the method according to the present invention in an existing electronic control unit without the necessity of structurally altering it. For this purpose, it carries out each step of the method according to the present invention, in particular when it is run on an electronic computing device or an electronic control unit. The electronic storage medium according to the present invention stores the computer program according to the present invention. By installing the computer program according to the present invention on an electronic control unit, the electronic control unit according to the present invention is obtained, which includes the electronic storage medium.

DETAILED DESCRIPTION

According to the present invention, test injections are introduced on two cylinders of an internal combustion engine of a motor vehicle within one work cycle and a relative difference in quantity is evaluated. For a diagnosis of errors of a quantity of fuel, the test injections are reduced to the two cylinders within one work cycle during an overrun phase of the motor vehicle. Torques generated in this process cause speed oscillations in a drive train of the motor vehicle which are measured as one complex oscillation amplitude having amount and phase. In this connection, the relevant oscillation amplitudes are those belonging to frequencies that meet certain and suitable engine orders. Such engine orders are the camshaft and crankshaft frequency. A system response to these test injections within one work cycle is a total amplitude, which is made up of a superposition of the complex oscillation amplitudes of the two participating cylinders. This makes it possible for a suitable selection of injection patterns and injection sequences to determine a relative volume ratio of the two torque-generating quantities of fuel or diagnose a relative incorrect quantity without knowing a drive train-dependent and operating point-dependent intensification effect of the internal combustion engine. In this connection, two basic specific embodiments of the method according to the present invention for diagnosing quantities of fuel and relative differences in quantity are conceivable.

Figure 1:
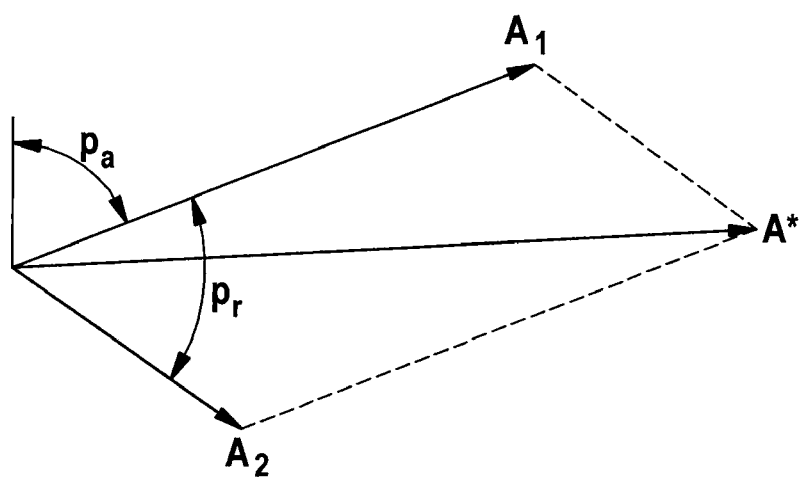
FIG. 1 shows the determination of the complex oscillation amplitudes from the total amplitude and phase information according to a first exemplary embodiment of the present invention.
Figure 2:
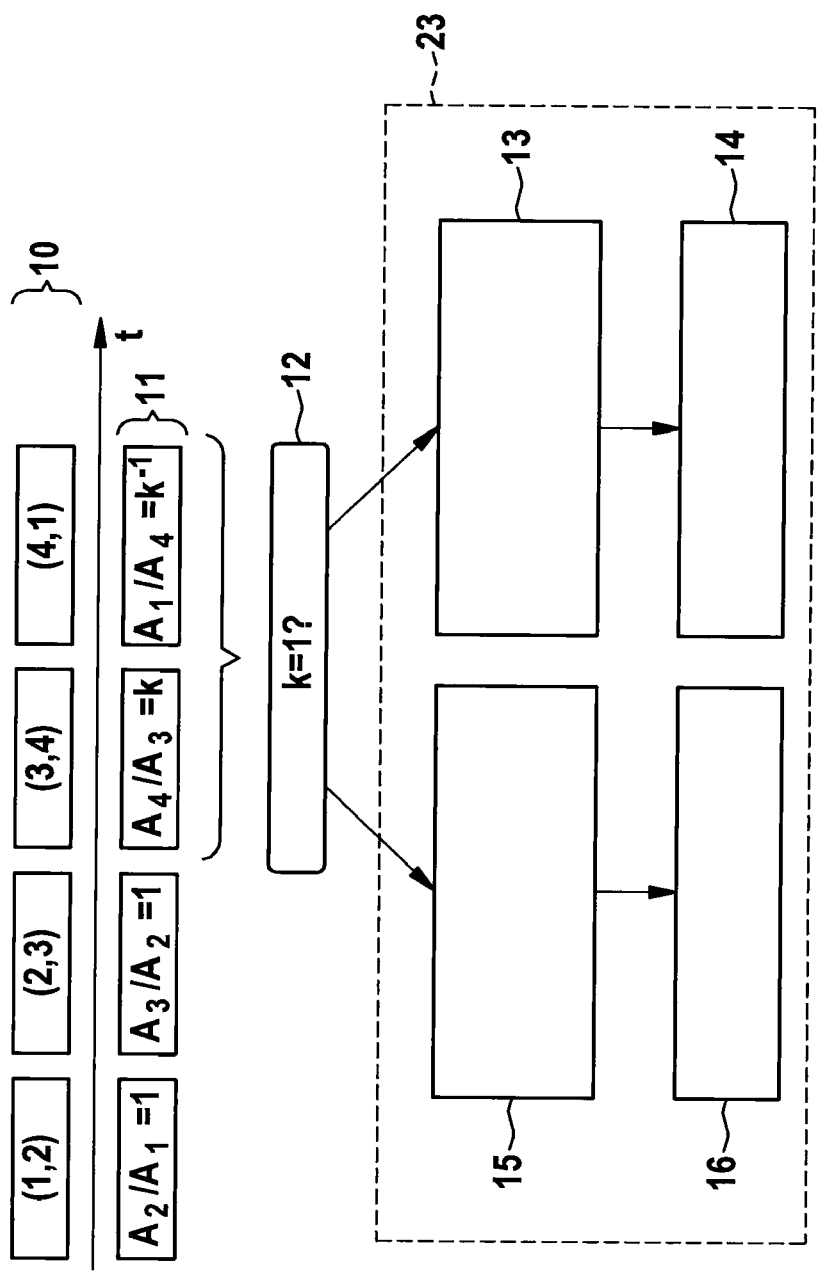
FIG. 2 shows the permutations of the cylinder according to a first exemplary embodiment of the present invention.

According to a first exemplary embodiment of the present invention, the test injections on the two cylinders are carried out using activation periods for which the same injection quantities are expected. In this case, one complex oscillation amplitude corresponds to the activation periods. From measured total amplitude A*, the two complex oscillation amplitudes A1 and A2, are calculated, index n of each complex oscillation amplitude An indicating the number of the cylinder in each case, under consideration of a relative phase pr between the two cylinders and an absolute phase pa of one of these cylinders (see FIG. 1). This corresponds to the inversion of the vector addition in the complex plane. Relative phase pr is defined here by the design of the internal combustion engine, whereas absolute phase pa is measured by the test injections into exclusively one of these two cylinders. Since absolute phase pa results exclusively from a transfer ratio of the drive train and internal combustion engine from torque to rotational speed, this is measured for each motor vehicle individually independent of actual fuel quantity and drift characteristics of the injector. A ratio of the complex oscillation amplitudes to one another corresponds to a ratio of the torque-generating injected quantities of fuel. According to this exemplary embodiment, multiple test injections are carried out within one work cycle for multiple cylinder permutations of cylinder pairs, the cylinder permutations being carried out in the firing order of the cylinders 10 for the multiple test injections within one work cycle (see FIG. 2). In this connection, the ratios of complex oscillation amplitudes An are calculated for individual cylinders 1, 2, 3, 4. Since the complex oscillation amplitudes of the cylinders are a measure of the injected quantity of fuel, their ratios are a measure of the relative difference in quantity. This means that a comparison is ultimately made of the relative difference in quantity of one cylinder (cylinder 4 in this exemplary embodiment) with the adjacent cylinders (cylinders 1 and 3 in this exemplary embodiment). The two ratios of complex oscillation amplitudes A4/A3=k and A1/A4=k−1 are calculated 11. Since A3 and A1 are assumed to be equal, since only the injection quantity which corresponds to A4 is to be checked, the amplitudes are ascertained as described above. This, however, corresponds to the determination of parameter k. Subsequently, it is decided 12 whether k is equal to 1. If parameter k is equal to 1, it becomes apparent 13 that no relative difference in quantity exists between the injectors of cylinders 1, 3 and 4 and the result of the diagnosis is negative 14. If parameter k is not equal to 1, it becomes apparent 15 that a relative difference in quantity exists between the injectors of cylinders 1, 3 and 4 and the result of the diagnosis is positive 16.

Figure 3:
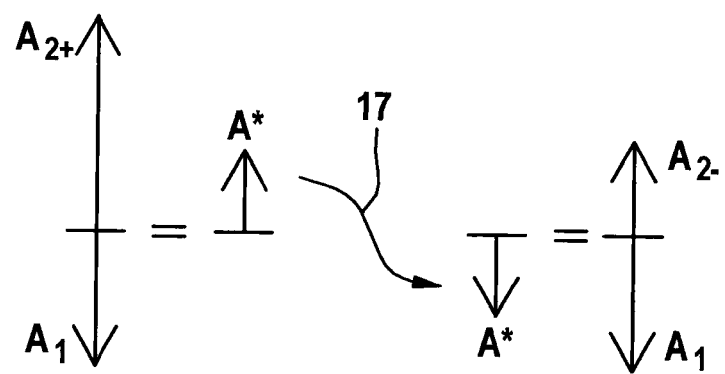
FIG. 3 shows the signal evaluation of the total amplitudes according to a second exemplary embodiment of the present invention.
Figure 4:
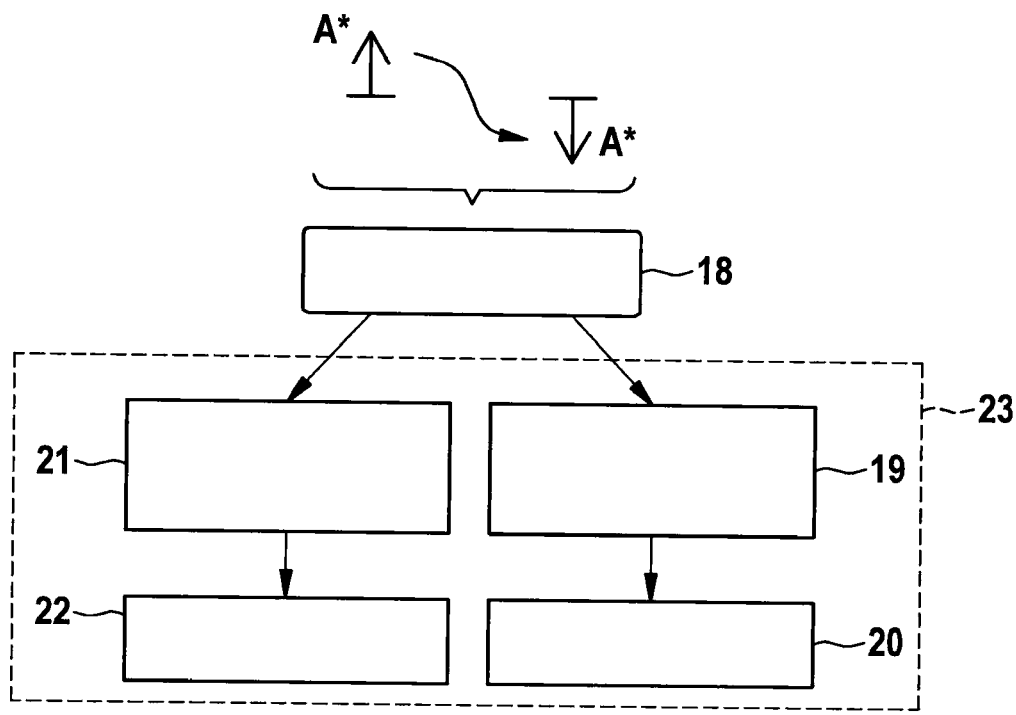
FIG. 4 shows the phase difference of the total amplitudes according to a second exemplary embodiment of the present invention.

In a second exemplary embodiment, two cylinders are selected for the test injections, whose complex oscillation amplitudes have a phase difference of 180°. The test injections on the two cylinders are carried out using different activation periods (AD1 and AD2-=AD1-ΔAD). In this connection, activation periods ADi are a measure of complex oscillation amplitude Ai and consequently receive the same indices. Furthermore, the test injections are repeated. In repetition 17 of the test injections, the activation period, which was shorter in the first test injections, is increased by double the amount of the difference (AD2+=AD1+ΔAD). In both test injections, the two total amplitudes are each measured and subsequently compared with one another (see FIG. 3). In this case, the total amplitudes are again indicated by an asterisk. It is subsequently investigated whether the total amplitudes have a phase difference from one another 18 (see FIG. 4). If the two total amplitudes have a phase difference of 180°, it becomes apparent 19 that both injectors inject the same quantity of fuel during same activation period AD1, meaning that the relative difference in quantity is zero and the result of the diagnosis is negative 20. If there is no phase difference between the two total amplitudes, it becomes apparent 21 that one of the two injectors supports a relative difference in quantity which is larger than the particular quantity of fuel which corresponds to the simple amount of difference ΔAD of the activation periods. In this case, the result of diagnosis is positive 22 (see FIG. 4).

Figure 5:
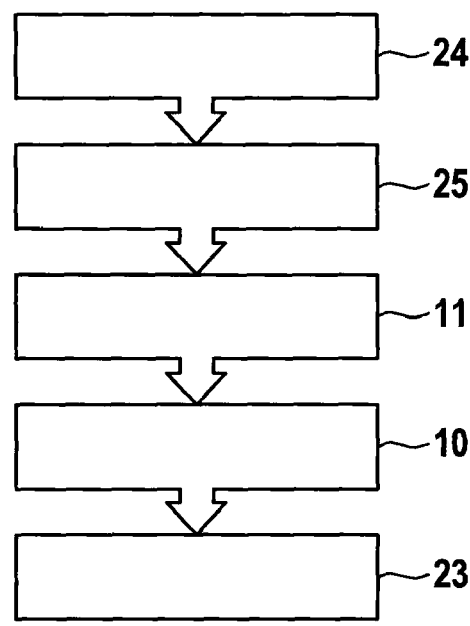
FIG. 5 shows a flow chart of a method according to a first exemplary embodiment of the present invention.
Figure 6:
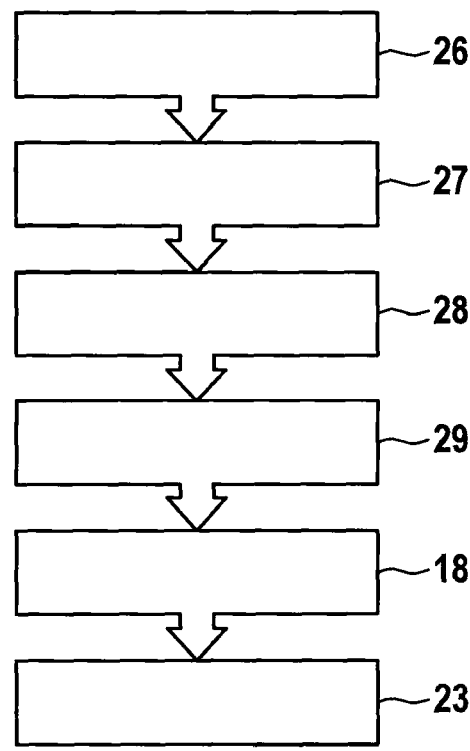
FIG. 6 shows a flow chart of a method according to a second exemplary embodiment of the present invention.

With reference to FIG. 5, the first exemplary embodiment is combined and with reference to FIG. 6, the second exemplary embodiment is combined. According to the first exemplary embodiment, the test injection is carried out on two cylinders within one work cycle 24. The complex oscillation amplitudes of the individual cylinders are determined from the measured total amplitude 25. Subsequently, the ratios of the complex oscillation amplitudes are calculated 11 and the cylinder permutations of the cylinder pairs are formed 10. Through this evaluation of the ratios of the complex oscillation amplitudes, result of diagnosis 23 is finally obtained. According to the second exemplary embodiment, an injection within one work cycle is carried out on the two cylinders having different activation periods AD1 and AD2–26, the complex oscillation amplitudes of the cylinders having a phase difference of 180°. Subsequently, the total amplitude is measured 27. The additional test injection within one work cycle is carried out subsequently on the two cylinders using activation periods AD1 and AD2+28. The total amplitude is also measured for this test injection 29. The phase difference of the two measured total amplitudes is subsequently determined 18. The result of diagnosis 23 results from this phase difference.

From a technical perspective with respect to quality and speed of diagnosis, a two-stage method from the first and second exemplary embodiments is particularly advantageous. In this connection, a first method step according to the second exemplary embodiment within a predefined time span delivers a tentative diagnosis, which is checked for plausibility and quantified by a second method step according to the first exemplary embodiment.

Furthermore, robustness-increasing functional measures are conceivable to avoid misdiagnoses as far as possible. For the first and second exemplary embodiments, the amount of the total amplitude may be compared against a signal noise. If the total amplitude is smaller than the amplitude of the typical signal noise, measurements on the test injections are discarded and carried out again. In this connection, the signal noise is a noise of a used signal under the same general conditions and operating points as in the measurements on the test injections, but without test injections. Furthermore, a phase plausibilization may be carried out in the case of the second exemplary embodiment. In this connection, the phase difference of the total amplitudes must lie between −10° and 10° or between 170° and 190°, otherwise the two total amplitudes are not plausible and are discarded and remeasured.

What is claimed is:

1. A method for determining a quantity of fuel during a direct injection of a motor vehicle, comprising:
    carrying out fuel test injections in two cylinders of an internal combustion engine of the motor vehicle during overrun phases within one work cycle;
    measuring speed oscillations of moved masses of the cylinders; and
    determining a relative difference in quantity of a quantity of fuel of the fuel test injections within one work cycle, the relative difference being determined based on the measured speed oscillations.

2. The method as recited in claim 1, wherein the fuel test injections into the two cylinders are carried out using activation periods for which the same injection quantities are applied.

3. The method as recited in claim 2, wherein two complex oscillation amplitudes are calculated from: (i) a total amplitude of the speed oscillations having two complex oscillation amplitudes, (ii) an absolute phase of a first one of the complex oscillation amplitudes, and (iii) a relative phase between the two complex oscillation amplitudes, wherein a ratio of the two complex oscillation amplitudes corresponds to a ratio of the injected quantities of fuel.

4. The method as recited in claim 1, wherein a tentative diagnosis is provided within a predefined time span, the tentative diagnosis being checked for plausibility and quantified.

5. A method for determining a quantity of fuel during a direct injection of a motor vehicle, comprising:
    carrying out fuel test injections in two cylinders of an internal combustion engine of the motor vehicle during overrun phases within one work cycle;
    measuring speed oscillations of moved masses of the cylinders; and
    determining a relative difference in quantity of a quantity of fuel of the fuel test injections within one work cycle, the relative difference being determined based on the measured speed oscillations;
    wherein the fuel test injections into the two cylinders are carried out using activation periods for which the same injection quantities are applied;
    wherein two complex oscillation amplitudes are calculated from: (i) a total amplitude of the speed oscillations having two complex oscillation amplitudes, (ii) an absolute phase of the first complex oscillation amplitude, and (iii) a relative phase between the two complex oscillation amplitudes, wherein a ratio of the two complex oscillation amplitudes corresponds to a ratio of the injected quantities of fuel;
    wherein the internal combustion engine has more than two cylinders, and wherein multiple fuel test injections are carried out within one work cycle for multiple cylinder permutations of cylinder pairs.

6. The method as recited in claim 5, wherein the cylinder permutations in the multiple fuel test injections within one work cycle are consistently selected in such a way that a phase difference of the complex oscillation amplitudes of the cylinders does not lie in the range from 170° to 190°.

7. The method as recited in claim 5, wherein a parameter is determined from a ratio of the complex oscillation amplitudes of multiple cylinder permutations, and whether a relative quantity difference occurs is ascertained from the parameter.

8. A method for determining a quantity of fuel during a direct injection of a motor vehicle, comprising:
    carrying out fuel test injections in two cylinders of an internal combustion engine of the motor vehicle during overrun phases within one work cycle;
    measuring speed oscillations of moved masses of the cylinders; and
    determining a relative difference in quantity of a quantity of fuel of the fuel test injections within one work cycle, the relative difference being determined based on the measured speed oscillations;
    wherein two complex oscillation amplitudes for the fuel test injections into two cylinders are selected in such a way that a phase difference of the two complex oscillation amplitudes lies in a range from 170° to 190°, the two fuel test injections into the cylinders being carried out using two different activation periods.

9. The method as recited in claim 8, wherein the two fuel test injections are repeated and the activation period which was shorter in a first method run is increased by double an amount of a difference between the two activation periods.

10. The method as recited in claim 9, wherein a total amplitude of the complex oscillation amplitudes is measured in each of the two method runs to produce two total amplitudes, the two total amplitudes being compared with one another to produce a result and the difference in quantity is inferred from the result.

11. The method as recited in claim 10, wherein the phase difference of the two total amplitudes is compared in the comparison.

12. A computer program for carrying out a method for determining a quantity of fuel during a direct injection of a motor vehicle, the computer program stored on a non-transitory computer-readable storage medium, the method comprising:
    carrying out fuel test injections in two cylinders of an internal combustion engine of the motor vehicle during overrun phases within one work cycle;
    measuring speed oscillations of moved masses of the cylinders; and
    determining a relative difference in quantity of a quantity of fuel of the fuel test injections within one work cycle, the relative difference being determined based on the measured speed oscillations.

13. A non-transitory electronic storage medium on which a computer program is stored, the computer program carrying out a method for determining a quantity of fuel during a direct injection of a motor vehicle, the method comprising:
    carrying out fuel test injections in two cylinders of an internal combustion engine of the motor vehicle during overrun phases within one work cycle;
    measuring speed oscillations of moved masses of the cylinders; and
    determining a relative difference in quantity of a quantity of fuel of the fuel test injections within one work cycle, the relative difference being determined based on the measured speed oscillations.

14. The non-transitory electronic storage medium as recited in claim 13, wherein:
    the fuel test injections into the two cylinders are carried out using activation periods for which the same injection quantities are expected;
    two complex oscillation amplitudes are calculated from: (i) a total amplitude of the speed oscillations having two complex oscillation amplitudes, (ii) an absolute phase of the first complex oscillation amplitude, and (iii) a relative phase between the two complex oscillation amplitudes, wherein a ratio of the two complex oscillation amplitudes corresponds to a ratio of the injected quantities of fuel; and
    wherein the internal combustion engine has more than two cylinders, and wherein multiple fuel test injections are carried out within one work cycle for multiple cylinder permutations of cylinder pairs.

15. The non-transitory computer readable storage medium as recited in claim 13, wherein two complex oscillation amplitudes for the fuel test injections into two cylinders are selected in such a way that a phase difference of the two complex oscillation amplitudes lies in a range from 170° to 190°, the two fuel test injections into the cylinders being carried out using two different activation periods.

16. An electronic control unit, comprising: a non-transitory electronic storage medium on which a computer program is stored, the computer program carrying out a method for determining a quantity of fuel during a direct injection of a motor vehicle, the method comprising: carrying out fuel test injections in two cylinders of an internal combustion engine of the motor vehicle during overrun phases within one work cycle; measuring speed oscillations of moved masses of the cylinders; and determining a relative difference in quantity of a quantity of fuel of the fuel test injections within one work cycle, the relative difference being determined based on the measured speed oscillations.

17. The electronic control unit as recited in claim 16, wherein:
    the fuel test injections into the two cylinders are carried out using activation periods for which the same injection quantities are expected;
    two complex oscillation amplitudes are calculated from: (i) a total amplitude of the speed oscillations having two complex oscillation amplitudes, (ii) an absolute phase of the first complex oscillation amplitude, and (iii) a relative phase between the two complex oscillation amplitudes, wherein a ratio of the two complex oscillation amplitudes corresponds to a ratio of the injected quantities of fuel; and
    wherein the internal combustion engine has more than two cylinders, and wherein multiple fuel test injections are carried out within one work cycle for multiple cylinder permutations of cylinder pairs.

18. The electronic control unit as recited in claim 16, wherein two complex oscillation amplitudes for the fuel test injections into two cylinders are selected in such a way that a phase difference of the two complex oscillation amplitudes lies in a range from 170° to 190°, the two fuel test injections into the cylinders being carried out using two different activation periods.

* * * * *